United States Patent [19]

Furukawa et al.

[11] 4,216,102

[45] Aug. 5, 1980

[54] HIGH DIELECTRIC CONSTANT TYPE CERAMIC COMPOSITION CONSISTING ESSENTIALLY OF $PB(FE_{1/2}NB_{1/2})O_3$-$PB(MG_{1/3}NB_{2/3})O_3$

[75] Inventors: Kiyoshi Furukawa, Akita; Shinobu Fujiwara, Nikahomachi; Nobuaki Kikuchi, Akita; Osamu Iizawa, Honjo; Hitoshi Tanaka, Nikahomachi; Hisayoshi Ueoka, Yachiyo, all of Japan

[73] Assignee: TDK Electronics Co., Ltd., Tokyo, Japan

[21] Appl. No.: 27,833

[22] Filed: Apr. 6, 1979

[30] Foreign Application Priority Data

| Apr. 10, 1978 | [JP] | Japan | 53-41974 |
| Apr. 14, 1978 | [JP] | Japan | 53-43859 |
| Apr. 14, 1978 | [JP] | Japan | 53-43860 |
| May 17, 1978 | [JP] | Japan | 53-58661 |
| May 17, 1978 | [JP] | Japan | 53-58662 |
| Jun. 6, 1978 | [JP] | Japan | 53-68038 |
| Jun. 20, 1978 | [JP] | Japan | 53-74499 |
| Aug. 3, 1978 | [JP] | Japan | 53-80648 |

[51] Int. Cl.$^2$ ............................................. H01B 3/12
[52] U.S. Cl. ............................. 252/63.2; 106/39.5; 252/63.5
[58] Field of Search ................... 252/63.2, 63.5; 106/39.5; 361/320, 321

[56] References Cited

U.S. PATENT DOCUMENTS

| 2,805,165 | 9/1957 | Goodman | 106/39.5 |
| 3,116,262 | 12/1963 | Goodman | 106/39.5 X |
| 3,464,785 | 9/1969 | Galasso | 252/63.5 X |
| 3,600,652 | 8/1971 | Riley | 252/63.2 X |
| 3,666,665 | 5/1972 | Chapman et al. | 106/39.5 X |
| 4,078,938 | 3/1978 | Yonezawa et al. | 252/63.5 X |

FOREIGN PATENT DOCUMENTS 46-33269  9/1971  Japan ...................................... 252/63.5

OTHER PUBLICATIONS

Yonezawa et al., "Properties of $Pb(Fe_{2/3}W_{1/3})O_3$–$Pb(Fe_{1/2}Nb_{1/2})O_3$ Ceramics", Proc. of the 1st Meeting on Ferroelectric Materials and Their Applications.

Primary Examiner—Harris A. Pitlick
Attorney, Agent, or Firm—Kenyon & Kenyon

[57] ABSTRACT

A novel ceramic composition exhibiting a solid solution structure of $Pb(Fe_{1/2}Nb_{1/2})O_3$—$Pb(Mg_{1/3}Nb_{2/3})O_3$, can be sintered at a low sintering temperature; have a high insulation resistance; have a relatively high dielectric constant in the high dielectric type ceramic dielectrics, and; have a low dielectric loss.

A particular amount of the additives, i.e., $pb(Mn_{1/2}W_{1/2})O_3$, $Pb(Mn_{1/3}Nb_{2/3})O_3$, MnO, $Pb(Mn_{1/3}Ta_{2/3})O_3$ $Li_2O$, $Cr_2O_3$ and $CeO_2$, is added into the composition mentioned above.

25 Claims, No Drawings

HIGH DIELECTRIC CONSTANT TYPE CERAMIC COMPOSITION CONSISTING ESSENTIALLY OF $Pb(Fe_{1/2}Nb_{1/2})O_3$-$Pb(Mg_{1/3}Nb_{2/3})O_3$

The present invention relates to a ceramic dielectric composition, which can be classified into a high dielectric constant type and a temperature-compensating type, and relates more particularly to the former type ceramic dielectric composition, which is characterized by being sintered at a relatively low temperature, exhibiting a high dielectric constant, a reduced dielectric loss, a low dependence of the properties upon temperature and enhanced insulation resistance. This ceramic dielectric composition is particularly suitable for "high dielectric constant" capacitors of a compact-type with large capacity, such as laminar capacitors.

Most ceramic dielectrics heretofore proposed for high dielectric constant capacitors contain, as the basic ingredient, a compound having a perovskite structure, such as barium titanate ($BaTiO_3$), barium stannate ($BaSnO_3$) and calcium titanate ($CaTiO_3$). Depending upon various requirements in using the dielectrics in the capacitors, an additional element, which constitutes the substitutional solid solution of the basic ingredient, is used for increasing the dielectric constant of ceramic dielectrics. A compound having a structure different from the perovskite structure, can be mixed with the basic ingredient so as to increase the dielectric constant of the ceramic dielectrics. In the most widely used dielectrics, the dielectric constant thereof is increased as mentioned above. In such increase of the dielectric constant, the Curie point of the dielectrics can be adjusted to a value corresponding to that at room temperature, so as to increase the dielectric constant to the maximum value, for example, from 4000 to 20000, which can be achieved by a dielectric comprising a particular basic ingredient. The temperature dependence of the dielectric constant of such dielectric is, however, increased by the increase of the dielectric constant. On the other hand, when the temperature dependence of the dielectric constant is decreased, the maximum value of dielectric constant is disadvantageously decreased.

Suitable sintering temperatures of the ceramic dielectric compositions mentioned above are generally 1,200° to 1,400° C. Accordingly, a large amount of heat energy is required for sintering. In addition, due to the high sintering temperature of from 1,200° to 1,400° C., the sintering furnace is considerably deteriorated and eroded during the sintering. As a result, the maintenance cost of the sintering furnace becomes, therefore, expensive.

Recently, a ceramic capacitor which is more compact and of more improved capacity, and possesses a high reliability, has been desired in the field, including the communication industry. Thus, a capacitor of a thin ceramic film having a 0.1 to 0.2 mm thickness and a ceramic laminar capacitor composed of a plurality of superimposed laminae, each having a thickness of approximately 50 microns or less, have been put to practical use.

In the production of the laminar ceramic capacitor, the laminated dielectric body, must be sintered, while the internal electrodes of the ceramic capacitor are inserted in the laminated body. Since the sintering temperature of the conventional ceramic dielectrics exceeds 1000° C., a noble metal, such as platinum or palladium, or their alloys had to be used as the internal electrodes, because the stable resistance of the electrodes at a temperature as high as 1300° C. could be provided by the noble metal.

It is proposed in German Offenlegungsschrift No. 27 01 411 that the sintering temperature of a high dielectric constant type ceramic composition be lowered to 1000° C. or less by preparing the composition from two components, i.e. $Pb(Fe_{2/3}W_{1/3})_xO_3$ and $Pb(Fe_{1/2}Nb_{1/2})_{1-x}O_3$. Since the laminated ceramic capacitor can be produced by a low sintering temperature of less than 1000° C., according to the proposal in the German Offenlegungsschrift, cheap materials such as silver, nickel, aluminum, and the like, can be used as the internal electrodes of the capacitor, and therefore, the production cost of the capacitor can advantageously be lowered from that of the prior art.

It is an object of the present invention to provide ceramic dielectric compositions which: can be sintered at a low sintering temperature; have a high insulation resistance; have a relatively high dielectric constant in the high dielectic type ceramic dielectrics, and; have a low dielectric loss.

It is another object of the present invention to improve properties, such as the insulation resistance and dielectric loss of the known, high dielectric constant type ceramic composition, which can be sintered at a low sintering temperature.

It is still another object of the present invention to provide ceramic capacitors of low dependence of insulation resistance upon ambient and sintering temperatures and high breakdown voltage.

It is a further object of the present invention to provide ceramic dielectric compositions particularly suitable for a high dielectric constant type capacitor of a compact and laminar type.

Other objects and advantages will be apparent from the following description.

In accordance with the objects of the present invention there is provided a high dielectric constant type-, ceramic composition, hereinafter referred to as the basic ceramic composition, which comprises from 67.99 to 68.58% of PbO, from 0.61 to 8.51% of $Fe_2O_3$, from 1.23 to 3.92% of MgO and from 22.27 to 26.89% of $Nb_2O_5$, all percentages being by weight based on the basic ceramic composition. The basic ceramic composition exhibits a solid solution structure of $Pb(Mg_{1/3}Nb_{2/3})O_3$-$Pb(Fe_{1/2}Nb_{1/2})O_3$.

Provided in accordance with the objects of the present invention are the following dielectric compositions, each of which includes an additive in their basic compositions.

A. A modified ceramic composition comprises a basic composition of, i.e., from 67.99 to 68.58% of PbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises $Pb(Mn_{2/3}W_{1/3})O_3$ in an amount of from 0.05 to 5.0 parts by weight based on 100 weight parts of the basic composition.

B. A modified ceramic composition comprises a basic composition of, i.e., from 67.99 to 68.58% of PbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises $Pb(Mn_{1/2}W_{1/2})O_3$ in an amount of from 0.05 to 5.0 parts by weight based on 100 weight parts of the basic composition.

C. A modified ceramic composition comprises a basic composition of, i.e., from 67.99 to 68.58% of PbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises $Pb(Mn_{\frac{1}{3}}Ta_{\frac{2}{3}})O_3$ in an amount of from 0.05 to 5.0 parts by weight based on 100 weight parts of the basic composition.

D. A modified ceramic composition comprises a basic composition of, i.e., from 67.99 to 68.58% of PbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises MnO in an amount of from 0.001 to 1.0 part by weight based on 100 weight parts of the basic ceramic composition.

E. A modified ceramic composition comprises a basic composition of, i.e., from 67.99 to 68.58% of pbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises $Pb(Mn_{\frac{1}{3}}Nb_{\frac{2}{3}})O_3$ in an amount of from 0.05 to 5.0 parts by weight based on 100 weight parts of the basic ceramic composition.

F. A modified ceramic composition comprises a basic composition of, i.e., from 67.99 to 68.58% of PbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises $Li_2O$ in an amount of from 0.01 to 2.0 parts by weight based on 100 weight parts of the basic composition.

G. A modified ceramic composition comprises a basic composition of, i.e., from 67.99 to 68.58% of pbO, from 0.61 to 8.51% of $Fe_2O_3$, from 1.23 to 3.92% of MgO and from 22.27 to 26.89% of $Nb_2O_5$, all these percentages being by weight based on the basic ceramic composition, and further comprises at least one member selected from the group consisting of $Cr_2O_3$ and $CeO_2$ in an amount of from 0.05 to 2.0 parts by weight based on 100 parts of the basic composition.

The properties and the embodiments of the ceramic compositions according to the present invention will now be illustrated.

Every high dielectric constant type ceramic composition according to the present invention can be sintered at a low temperature ranging from 800° to less than 1000° C. When the PbO content in the ceramic compositions is more than 68.58% by weight, the ceramic compositions must be sintered at a temperature exceeding 1000° C. On the other hand, when the PbO content is less than 67.99% by weight, the dielectric constant of the ceramic composition is too low for the ceramic composition to be used on a practical basis. The insulation resistance of the ceramic compositions is decreased when the $Fe_2O_3$ content is more than 8.5% by weight. On the other hand, when the $Fe_2O_3$ content is decreased to less than 0.61% by weight, the dielectric constant is decreased and the sintering temperature is increased. When the MgO content is more than 3.92% by weight, the sintering temperature is increased and the dielectric constant is decreased. On the other hand, when the MgO content is less than 1.23% by weight, the insulation resistance is decreased and the dielectric loss (tan$\delta$) is increased. With regard to the $Nb_2O_5$ content, it has been found that the dielectric constant is too low when the $Nb_2O_5$ content is more than 26.89%, while the insulation resistance is decreased when the $Nb_2O_5$ content is less than 22.27%. It is therefore apparent that a high dielectric constant and a high insulation resistance as well as a low sintering temperature and a low dielectric loss are provided when the ceramic compositions of the present invention comprise from 67.99 to 68.58% of PbO, from 0.61 to 8.5% of $Fe_2O_3$, from 0.61 to 3.92% of MgO and from 26.89 to 22.27% of $Nb_2O_5$. This composition correspond (although not strictly) to a novel solid solution in the field of ceramic dielectrics, i.e., a solid solution of from 5 to 70 mol% of $Pb(Fe_{\frac{1}{2}}Nb_{\frac{1}{2}})O_3$ and from 30 to 95 mol% of $Pb(Mg_{\frac{1}{3}}Nb_{\frac{2}{3}})O_3$.

In the basic ceramic composition which is capable of being sintered at a temperature lower than 1000° C. according to the present invention, the relative dielectric constant ($\epsilon s$), which is simply referred to as the dielectric constant in the present specification, is from 6000 to 14000 and therefore high. Furthermore, the dielectric loss (tan$\delta$) is from 0.1 to 2.1% and therefore low. A preferable basic ceramic composition comprises from 68.26 to 68.58% of PbO, from 0.61 to 4.88% of $Fe_2O_3$, 2.47 to 3.92% of MgO, and from 24.39 to 26.89% of $Nb_2O_5$, and exhibits a dielectric loss of 1.3% or less as 1 KHz and an insulation resistance of more than $10^{10}\Omega$. The insulation resistance described in the present specification indicates the resistance of a ceramic composition having a thickness of approximately 0.5 mm. Such resistance value is measured at 20° C. when a dielectric current of 500 volts is applied to the ceramic composition.

By adding a particular amount of the additives, i.e., $Pb(Mn_{\frac{2}{3}}W_{\frac{1}{3}})O_3$, $Pb(Mn_{\frac{1}{3}}W_{\frac{1}{2}})O_3$, $Pb(Mn_{\frac{1}{3}}Ta_{\frac{2}{3}})O_3$, MnO, $Pb(Mn_{\frac{1}{3}}Nb_{\frac{2}{3}})O_3$, $Li_2O$, $Cr_2O_3$ and $CeO_2$, into the basic composition, the dielectric loss and the insulation resistance of the basic ceramic composition can be decreased to a level lower than that of the basic ceramic composition. When the content of these additives exceeds the maximum amount defined in the description of the modified ceramic compositions, the dielectric constant ($\epsilon s$) is disadvantageously reduced and the dielectric loss (tan$\delta$) and the insulation resistance are both reduced to levels lower than the levels at which the ceramic composition can be used on a practical basis.

It has been established that the addition of the above additives basically exerts an influence on the electrical properties i.e., $\epsilon s$ and tan $\delta$, of the ceramic composition, as mentioned hereinbefore. However, it has also been found that an addition of $Li_2O$ which exceeds the defined maximum amount, into the basic composition will increase the sintering temperature.

A modified ceramic composition containing $Pb(Mn_{\frac{2}{3}}W_{\frac{1}{3}})O_3$ and capable of being sintered at temperature lower than 1000° C. exhibits a dielectric constant ($\epsilon s$) of from approximately 5000 to 13000, a dielectric loss (tan $\delta$ at 1 KHz) of from 0.07 to 2.0%, and an insulation resistance of $7 \times 10^{10}$ or more. The additive content is preferably from 0.05 to 0.5 part by weight, and the basic composition is preferably from 68.35 to 68.58% of PbO, from 0.61 to 3.67% of $Fe_2O_3$, from 25.10 to 26.89% of $Nb_2O_5$ and from 2.88 to 3.92% of MgO. When the additive content and the basic composition fall within the above respective preferable ranges, the dielectric loss (tan $\delta$ at 1 KHz) is 0.5% or less and the insulation resistance is $10^{11}\Omega$ or more.

Another modified ceramic composition containing $Pb(Mn_{\frac{1}{2}}W_{\frac{1}{2}})O_3$ and capable of being sintered at a temperature less than 1000° C. exhibits a dielectric constant ($\epsilon s$) of from approximately 5000 to 13000, a dielectric loss (tan$\delta$) of from 0.07 to 2.0%, and an insulation resistance of $7 \times 10^{10}$ or more. The additive content is preferably from 0.05 to 0.5 part by weight, and the basic composition is preferably from 68.35 to 68.58% of PbO, from 0.61 to 3.67% of $Fe_2O_3$, from 25.10 to 26.89% of $Nb_2O_5$ and from 2.88 to 3.92% of MgO. When the additive content and the basic composition fall within the above respective preferable ranges, the dielectric loss (tan δ at 1 KHz) is 1.0% or less and the insulation resistance is $10^{11}\Omega$ or more. When the basic composition is from 68.5 to 68.6% of PbO, from 0.61 to 1.0% of $Fe_2O_3$, from 26.0 to 26.89% of $Nb_2O_5$ and from 3.5 to 3.92% of MgO, the dielectric loss (tan δ at 1 KHz) is less than 0.1%.

A still another modified ceramic composition containing $Pb(Mn_{\frac{1}{3}}Ta_{\frac{2}{3}})O_3$ and capable of being sintered at a temperature less than 1000° C. exhibits a dielectric constant (εs) of from approximately 4900 to 12000, a dielectric loss (tan δ at 1 KHz) of from 0.1 to 1.6%, and an insulation resistance of $4 \times 10^{11}\Omega$ or more.

A modified composition containing MnO and capable of being sintered at a temperature lower than 1000° C. exhibits a dielectric constant (εs) of from approximately 5200 to 12600, a dielectric loss (tan δ at 1 KHz) of from 0.2 and 1.1%, and an insulation resistance of from $1 \times 10^{10}$ to $1 \times 10^{11}\Omega$. The additive content is preferably from 0.001 to less than 0.5 part by weight. When the additive content falls within the above preferable range, the dielectric loss (tan δ at 1 KHz) is approximately 1% or less.

A modified composition containing $Pb(Mn_{\frac{1}{3}}Nb_{\frac{2}{3}})O_3$ additive and capable of being sintered at a temperature lower than 1000° C. exhibits a dielectric constant (εs) of from approximately 4200 to 11000, a dielectric loss (tan δ at 1 KHz) of from 0.1 to 0.9%, and an insulation resistance of from $2 \times 10^{10}$ to $4 \times 10^{11}$. The additive content is preferably from 0.05 to 0.5 part by weight. When the additive content falls within the above preferable range, the dielectric loss (tan δ at 1 KHz) is 0.2% or less and the insulation resistance is $10^{11}\Omega$ or more.

A modified composition containing the $Li_2O$ additive and capable of being sintered at a temperature lower than 1000° C. exhibits a dielectric constant (εs) of from approximately 4700 to 12800, a dielectric loss (tan δ at 1 KHz) of from 0.3 to 1.5%, and an insulation resistance of from $3 \times 10^{10}$ to $6 \times 10^{11}$. The additive content is preferably from 0.05 to 0.1 a part by weight. When the additive content falls within the above preferable range, the dielectric loss (tan δ at 1 KHz) is 0.7% or less and the insulation resistance is $1 \times 10^{11}\Omega$ or more.

A modified composition containing the $Cr_2O_3$ and/or $CeO_2$ additive and capable of being sintered at a temperature lower than 1000° C. exhibits a dielectric constant (εs) of from approximately 5600 to 13600, a dielectric loss (tan δ at 1 KHz) of from 0.2 to 2.8%, and an insulation resistance of from $6 \times 10^9$ to $8 \times 10^{11}$. The additive content is preferably from 0.05 to 0.5 part by weight, and the basic composition is preferably from 68.17 to 68.58% of PbO, from 0.61 to 6.10% of $Fe_2O_3$, from 23.68 to 26.89% of $Nb_2O_5$ and from 2.05 to 3.92% of MgO. When the additive content and basic composition fall within the above preferable ranges, the dielectric loss (tan δ at 1 KHz) is 2.0% or less and the insulation resistance is $3 \times 10^{10}\Omega$ or more. When the basic composition is from 68.5 to 68.58% of PbO, from 0.61 to 1.0% of $Fe_2O_3$, from 26.0 to 26.89% of $Nb_2O_5$, and from 3.0 to 3.92% of MgO, the dielectric constant is more than 13000 and the dielectric constant (tan δ at 1 KHz) is less than 0.5%.

The ceramic compositions according to the present invention exhibit a high insulation resistance and can therefore be used for forming a high-voltage capacitor. In addition, these ceramic compositions can be used in the capacitor as a thin film having a thickness of 30–40 microns. The high insulation resistance can be utilized to solve the problem of electromigration, which causes the properties of a capacitor to be deteriorated, according to the type of ions of a ceramic composition being moved therein under the effect of a voltage applied from the capacitor electrode to the ceramic composition.

The additives according to the present invention can provide the modified ceramic composition with a dielectric constant, dielectric loss and insulation resistance which are all equivalent or superior to those of the basic ceramic composition, while the sintering temperature of the former composition is kept lower than that of the latter composition.

One of the properties which must be provided in any capacitor is the property of maintaining a low dependence of the dielectric constant upon temperature. The dielectric constant of the basic composition is decreased by a temperature decrease of from room temperature to −25° C. in an amount not exceeding approximately 55%. This dielectric constant is increased or decreased by a temperature increase of from room temperature to 85° C. in an amount not exceeding approximately 50%. The total change during the temperature decrease and increase mentioned above does not exceed approximately 80%, preferably 70%. The following additives, i.e., $Pb(Mn_{\frac{1}{3}}Nb_{\frac{2}{3}})O_3$, $Pb(Mn_{\frac{1}{3}}Ta_{170})O_3$ and MnO, can be used to further reduce and thus stabilize the temperature dependence.

One of the properties which must be provided in any PbO containing ceramic is the property of preventing vaporization of the PbO during sintering. The manganese containing additives can effectively prevent the PbO vaporization and can thus contribute to the stabilization of the sintering process.

The ceramic dielectric compositions of the present invention may be prepared as follows. Finely divided particles or powders of respective metal oxides are blended with each other using a ball mill and shaped into a suitable form. After a binder is added to the powders, the powders are press-formed, for example, into discs. The discs are sintered at a temperature of from 800° less than 1000° C. for a period of one to two hours, enclosed in a magnesia ceramic vessel. Each disc is plated with a silver, nickel or aluminum electrode. Instead of metal oxides, metal carbonates may be used.

The present invention is explained further in detail by way of a single example.

EXAMPLE

In the example, the lead oxide (PbO), magnesium oxide (MgO), iron oxide ($Fe_2O_3$), niobium oxide ($Nb_2O_5$), manganese oxide (MnO), tungsten oxide ($WO_3$), lithium oxide ($Li_2O$), chromium oxide ($Cr_2O_3$) and cerium oxide ($CeO_2$), all in powdered form, were weighed so that the oxides were contained in the ceramic composition in the proportion as shown in Table 1, below. These oxide mixture serving as the raw material of the ceramic composition were blended in a bowl made of an organic resin, under a moist condition and thereafter presintered at a temperature ranging from 700° to 850° C. over a period of two hours. Subsequently, chemical reactions occurred between the powders. The so-reacted sintered powders were crushed to a particles having a diameter of a few microns and were blended again with each other so as to obtain a powdered mixture. A predetermined amount of binder of polyvinyl alcohol (PVA) was added into the powdered mixture, which was then shaped under a shaping pressure of approximately 3 tons 1 cm² into discs having a diameter of 16.5 mm and a thickness of 0.6 mm. The shaped discs were air-tightly sealed in a magnesia ceramic vessel so as to prevent the lead component from being evaporated from the discs during sintering. The final sintering was carried out over a period of two hours, and ceramic bodies were produced. Thereafter, a silver electrode was baked onto each side of the ceramic bodies. The ceramic bodies with the pair of electrodes were used as samples for measuring electric properties, i.e., the dielectric constant ($\epsilon$s at 1 KHz at 20° C.), the dielectric loss (tan $\delta$ at 1 KHz at 20° C. and 85° C.), the insulation resistance (IR) the temperature dependence of the dielectric constant ($\epsilon$s at 1 KHz) and resistivity ($\delta.\Omega$-cm at 20° C.), were measured with regard to several samples. Such temperature dependence was measured at $-25$° C. and $+85$° C. based on the room temperature of 20° C. as the standard value. The measurement results are shown in Table 1, in which the asterisked sample designates the control sample and the components A and B designate $Pb(Fe_{\frac{1}{2}}Nb_{\frac{1}{2}})O_3$ and $Pb(Mg_{\frac{1}{3}}Nb_{\frac{2}{3}})O_3$, respectively.

Table 1

| Sample No. | Basic Ingredients (mol %) A | B | Additive (wt part) | Proportion of Oxides PbO | Fe$_2$O$_3$ | MgO | Nb$_2$O$_5$ | Additive Oxide | Electric Properties $\epsilon$s | tan $\delta$ 20° C. | 85° C. | IR ($\Omega$) | $\rho$($\Omega$-cm) |
|---|---|---|---|---|---|---|---|---|---|---|---|---|---|
| 1* | 0 | 100 | 0 | 68.63 | | 4.13 | 27.24 | 0 | 8000 | 0.1 | 0.1 | 4 × 10$^{11}$ | — |
| 2* | 1 | 99 | 0 | 68.62 | 0.12 | 4.09 | 27.17 | 0 | 10800 | 0.1 | 0.1 | 3 × 10$^{11}$ | 6.8×10$^{12}$ |
| 3* | 5 | 95 | 0 | 68.58 | 0.61 | 3.92 | 26.89 | 0 | 11900 | 0.1 | 0.1 | 2 × 10$^{11}$ | 4.5×10$^{12}$ |
| 4 | 10 | 90 | 0 | 68.53 | 1.23 | 3.71 | 26.53 | 0 | 13500 | 0.2 | 0.1 | 2 × 10$^{11}$ | 1.1×10$^{13}$ |
| 5 | 20 | 80 | 0 | 68.44 | 2.45 | 3.30 | 25.81 | 0 | 13100 | 0.8 | 0.1 | 6 × 10$^{10}$ | 4.5×10$^{12}$ |
| 6 | 30 | 70 | 0 | 68.35 | 3.67 | 2.88 | 25.10 | 0 | 13000 | 0.8 | 0.1 | 5 × 10$^{10}$ | 1.8×10$^{12}$ |
| 7 | 40 | 60 | 0 | 68.26 | 4.88 | 2.47 | 24.39 | 0 | 11200 | 1.3 | 0.1 | 1 × 10$^{10}$ | 1.1×10$^{12}$ |
| 8 | 50 | 50 | 0 | 68.17 | 6.10 | 2.05 | 23.68 | 0 | 9200 | 1.8 | 0.5 | 8 × 10$^{9}$ | 6.8×10$^{11}$ |
| 9 | 60 | 40 | 0 | 68.08 | 7.31 | 1.64 | 22.97 | 0 | 7900 | 2.0 | 0.5 | 6 × 10$^{9}$ | 4.5×10$^{11}$ |
| 10 | 70 | 30 | 0 | 67.99 | 8.51 | 1.23 | 22.27 | 0 | 6000 | 2.1 | 0.6 | 3 × 10$^{9}$ | 2.2×10$^{11}$ |
| 11* | 75 | 25 | 0 | 67.95 | 9.12 | 1.02 | 21.91 | 0 | 3900 | 2.5 | 0.8 | 4 × 10$^{8}$ | 6.8×10$^{10}$ |
| 12* | 90 | 10 | 0 | 67.81 | 10.92 | 0.41 | 20.86 | 0 | 2800 | 5.0 | 1.0 | 4 × 10$^{7}$ | 4.5×10$^{9}$ |

| Sample No. | Basic Ingredients (mol %) A | B | Additive (wt part) Pb(Mn$_{\frac{1}{2}}$W$_{\frac{1}{2}}$)O$_3$ | Proportion of Oxides PbO | Fe$_2$O$_3$ | MgO | Nb$_2$O$_5$ | Pb(Mn$_{\frac{1}{2}}$W$_{\frac{1}{2}}$)O$_3$ | Electric Properties $\epsilon$s | tan $\delta$ 20° C. | 85° C. | IR ($\Omega$) | $\rho$($\Omega$-cm) |
|---|---|---|---|---|---|---|---|---|---|---|---|---|---|
| 13* | 5 | 95 | 0 | 68.58 | 0.61 | 3.92 | 26.89 | 0 | 11900 | 0.19 | 0.1 | 2 × 10$^{11}$ | 4.5×10$^{12}$ |
| 14 | 5 | 95 | 0.05 | 68.58 | 0.61 | 3.92 | 26.89 | 0.05 | 11800 | 0.07 | 0.05 | 2 × 10$^{11}$ | 4.5×10$^{12}$ |
| 15 | 5 | 95 | 0.5 | 68.58 | 0.61 | 3.92 | 26.89 | 0.5 | 11300 | 0.07 | 0.05 | 5 × 10$^{11}$ | 1.1×10$^{13}$ |
| 16 | 5 | 95 | 5.0 | 68.58 | 0.61 | 3.92 | 26.89 | 5.0 | 7015 | 0.5 | 0.1 | 7 × 10$^{10}$ | 1.6×10$^{12}$ |
| 17 | 5 | 95 | 10.0 | 68.58 | 0.61 | 3.92 | 26.89 | 10.0 | 3000 | 1.2 | 0.5 | 4 × 10$^{9}$ | 2.3×10$^{11}$ |
| 18* | 30 | 70 | 0 | 68.35 | 3.67 | 2.88 | 25.10 | 0 | 13000 | 0.8 | 0.1 | 5 × 10$^{10}$ | 1.8 × 10$^{12}$ |
| 19 | 30 | 70 | 0.05 | 68.35 | 3.67 | 2.88 | 25.10 | 0.05 | 12900 | 0.5 | 0.05 | 2 × 10$^{11}$ | 4.5×10$^{12}$ |
| 20 | 30 | 70 | 0.5 | 68.35 | 3.67 | 2.88 | 25.10 | 0.5 | 12300 | 0.3 | 0.05 | 5 × 10$^{11}$ | 1.1×10$^{13}$ |
| 21 | 30 | 70 | 5.0 | 68.35 | 3.67 | 2.88 | 25.10 | 5.0 | 6500 | 1.0 | 0.10 | 7 × 10$^{10}$ | 1.6×10$^{12}$ |
| 22* | 30 | 70 | 10.0 | 68.35 | 3.67 | 2.88 | 25.10 | 10.0 | 3250 | 2.5 | 0.6 | 3 × 10$^{9}$ | 6.8×10$^{10}$ |
| 23* | 70 | 30 | 0 | 67.99 | 8.51 | 1.23 | 22.27 | 0 | 6000 | 2.1 | 0.6 | 3 × 10$^{10}$ | 2.3×10$^{11}$ |
| 24 | 70 | 30 | 0.05 | 67.99 | 8.51 | 1.23 | 22.27 | 0.05 | 5900 | 1.0 | 0.4 | 7 × 10$^{10}$ | 1.6×10$^{12}$ |
| 25 | 70 | 30 | 0.5 | 67.99 | 8.51 | 1.23 | 22.27 | 0.5 | 5700 | 1.0 | 0.2 | 3 × 10$^{11}$ | 6.8×10$^{12}$ |
| 26 | 70 | 30 | 5.0 | 67.99 | 8.51 | 1.23 | 22.27 | 5.0 | 4800 | 1.0 | 0.6 | 1 × 10$^{11}$ | 2.3×10$^{12}$ |
| 27* | 70 | 30 | 10.0 | 67.99 | 8.51 | 1.23 | 22.27 | 10.0 | 1500 | 4.0 | 1.5 | 4 × 10$^{9}$ | 9.0×10$^{10}$ |

| Sample No. | Basic Ingredients (mol %) A | B | Additive (wt part) Pb(Mn$_{\frac{1}{2}}$W$_{\frac{1}{2}}$)O$_3$ | Proportion of Oxides PbO | Fe$_2$O$_3$ | MgO | Nb$_2$O$_5$ | Pb(Mn$_{\frac{1}{2}}$W$_{\frac{1}{2}}$)O$_3$ | Electric Properties $\epsilon$s | tan $\delta$ 20° C. | 85° C. | IR ($\Omega$) | $\rho$($\Omega$-cm) |
|---|---|---|---|---|---|---|---|---|---|---|---|---|---|
| 28* | 5 | 95 | 0 | 68.58 | 0.61 | 3.92 | 26.89 | 0 | 11900 | 0.1 | 0.1 | 2 × 10$^{11}$ | 4.5×10$^{12}$ |
| 29 | 5 | 95 | 0.05 | 68.58 | 0.61 | 3.92 | 26.89 | 0.05 | 11800 | 0.07 | 0.05 | 2 × 10$^{11}$ | 4.5×10$^{12}$ |
| 30 | 5 | 95 | 0.5 | 68.58 | 0.61 | 3.92 | 26.89 | 0.5 | 11300 | 0.07 | 0.05 | 5 × 10$^{11}$ | 1.1×10$^{13}$ |
| 31 | 5 | 95 | 5.0 | 68.58 | 0.61 | 3.92 | 26.89 | 5.0 | 7015 | 0.5 | 0.1 | 7 × 10$^{10}$ | 1.6 × 10$^{12}$ |
| 32* | 5 | 95 | 10.0 | 68.58 | 0.61 | 3.92 | 26.89 | 10.0 | 3000 | 1.2 | 0.5 | 4 × 10$^{9}$ | 9.0×10$^{10}$ |
| 33* | 30 | 70 | 0 | 68.35 | 3.67 | 2.88 | 25.10 | 0 | 13000 | 0.8 | 0.1 | 5 × 10$^{10}$ | 1.8×10$^{12}$ |
| 34 | 30 | 70 | 0.05 | 68.35 | 3.67 | 2.88 | 25.10 | 0.05 | 12900 | 0.5 | 0.05 | 2 × 10$^{11}$ | 4.5×10$^{12}$ |
| 35 | 30 | 70 | 0.5 | 68.35 | 3.67 | 2.88 | 25.10 | 0.5 | 12300 | 0.3 | 0.05 | 5 × 10$^{11}$ | 1.1×10$^{13}$ |
| 36 | 30 | 70 | 5.0 | 68.35 | 3.67 | 2.88 | 25.10 | 5.0 | 6500 | 1.0 | 0.07 | 7 × 10$^{10}$ | 1.6×10$^{12}$ |
| 37* | 30 | 70 | 10.0 | 68.35 | 3.67 | 2.88 | 25.10 | 10.0 | 3250 | 2.5 | 0.5 | 3 × 10$^{9}$ | 2.3×10$^{11}$ |
| 38* | 70 | 30 | 0 | 67.99 | 8.51 | 1.23 | 22.27 | 0 | 6000 | 2.1 | 0.6 | 3 × 10$^{9}$ | 2.3×10$^{11}$ |
| 39 | 70 | 30 | 0.05 | 67.99 | 8.51 | 1.23 | 22.27 | 0.05 | 5900 | 1.0 | 0.4 | 7 × 10$^{10}$ | 1.6×10$^{12}$ |
| 40 | 70 | 30 | 0.5 | 67.99 | 8.51 | 1.23 | 22.27 | 0.5 | 5700 | 1.0 | 0.4 | 3 × 10$^{11}$ | 6.8×10$^{12}$ |
| 41 | 70 | 30 | 5.0 | 67.99 | 8.51 | 1.23 | 22.27 | 5.0 | 4800 | 2.0 | 0.6 | 1 × 10$^{11}$ | 2.3×10$^{12}$ |
| 42* | 70 | 30 | 10.0 | 67.99 | 8.51 | 1.23 | 22.27 | 10.0 | 1500 | 4.0 | 1.3 | 4 × 10$^{9}$ | 9.0×10$^{10}$ |

| Sample No. | Basic Ingredients (mol %) A | B | Additive (wt part) Pb(Mn$_{\frac{1}{3}}$Ta$_{\frac{2}{3}}$)O$_3$ | Proportion of Oxides PbO | Fe$_2$O$_3$ | MgO | Nb$_2$O$_5$ | Pb(Mn$_{\frac{1}{3}}$Ta$_{\frac{2}{3}}$)O$_3$ | Electric Properties $\epsilon$s | tan $\delta$ 20° C. | 85° C. | IR ($\Omega$) | $\rho$($\Omega$-cm) |
|---|---|---|---|---|---|---|---|---|---|---|---|---|---|
| 43* | 5 | 95 | 0 | 68.58 | 0.61 | 3.92 | 26.89 | 0 | 12800 | 0.2 | 0.1 | 2 × 10$^{11}$ | 4.5×10$^{12}$ |

Table 1-continued

| Sample No. | Basic Ingredients (mol %) A | B | Additive (wt part) MnO | Proportion of Oxides PbO | Fe$_2$O$_3$ | MgO | Nb$_2$O$_5$ | MnO | Electric Properties $\epsilon s$ | tan δ 20° C. | 85° C. | IR (Ω) | ρ(Ω-cm) |
|---|---|---|---|---|---|---|---|---|---|---|---|---|---|
| 44 | 5 | 95 | 0.05 | 68.58 | 0.61 | 3.92 | 26.98 | 0.05 | 12100 | 0.1 | 0.05 | 4 × 10$^{10}$ | 9.0 × 10$^{12}$ |
| 45 | 5 | 95 | 0.5 | 68.58 | 0.61 | 3.92 | 26.89 | 0.5 | 11400 | 0.1 | 0.05 | 3 × 10$^{11}$ | 1.4 × 10$^{13}$ |
| 46 | 5 | 95 | 5.0 | 68.58 | 0.61 | 3.92 | 26.89 | 5.0 | 10200 | 1.2 | 0.1 | 2 × 10$^{10}$ | 1.8 × 10$^{12}$ |
| 47* | 5 | 95 | 10.0 | 68.58 | 0.61 | 3.92 | 26.89 | 10.0 | 8300 | 3.1 | 0.5 | 2 × 10$^{9}$ | 2.3 × 10$^{11}$ |
| 48* | 50 | 50 | 0 | 68.17 | 6.10 | 2.05 | 23.68 | 0 | 9300 | 1.9 | 0.5 | 8 × 10$^{9}$ | 6.8 × 10$^{11}$ |
| 49 | 50 | 50 | 0.05 | 68.17 | 6.10 | 2.05 | 23.68 | 0.05 | 9100 | 0.3 | 0.2 | 6 × 10$^{10}$ | 1.8 × 10$^{12}$ |
| 50 | 50 | 50 | 0.5 | 68.17 | 6.10 | 3.05 | 23.68 | 0.5 | 8800 | 0.1 | 0.1 | 4 × 10$^{11}$ | 2.3 × 10$^{12}$ |
| 51 | 50 | 50 | 5.0 | 68.17 | 6.10 | 2.05 | 23.68 | 5.0 | 7200 | 1.6 | 0.2 | 3 × 10$^{10}$ | 1.8 × 10$^{12}$ |
| 52* | 50 | 50 | 10.0 | 68.17 | 6.10 | 2.05 | 23.68 | 10.0 | 5100 | 3.2 | 0.5 | 4 × 10$^{9}$ | 9.0 × 10$^{11}$ |
| 53* | 70 | 30 | 0 | 67.99 | 8.51 | 1.23 | 22.27 | 0 | 6200 | 2.2 | 0.6 | 4 × 10$^{9}$ | 2.3 × 10$^{11}$ |
| 54 | 70 | 30 | 0.05 | 67.99 | 8.51 | 1.23 | 22.27 | 0.05 | 6000 | 0.9 | 0.5 | 5 × 10$^{10}$ | 1.1 × 10$^{12}$ |
| 55 | 70 | 30 | 0.5 | 67.99 | 9.51 | 1.23 | 22.27 | 0.5 | 5700 | 0.2 | 0.3 | 4 × 10$^{11}$ | 9.0 × 10$^{12}$ |
| 56 | 70 | 30 | 5.0 | 67.99 | 8.51 | 1.23 | 22.27 | 5.0 | 4900 | 1.6 | 0.7 | 4 × 10$^{10}$ | 9.0 × 10$^{11}$ |
| 57* | 70 | 30 | 10.0 | 67.99 | 8.51 | 1.23 | 22.27 | 10.0 | 3900 | 2.4 | 1.5 | 1 × 10$^{9}$ | 1.1 × 10$^{11}$ |

| Sample No. | Basic Ingredients (mol %) A | B | Additive (wt part) MnO | Proportion of Oxides PbO | Fe$_2$O$_3$ | MgO | Nb$_2$O$_5$ | MnO | Electric Properties $\epsilon s$ | tan δ 20° C. | 85° C. | IR (Ω) | ρ(Ω-cm) |
|---|---|---|---|---|---|---|---|---|---|---|---|---|---|
| 58* | 30 | 70 | 0 | 68.35 | 3.67 | 2.88 | 25.10 | 0 | 13000 | 0.8 | 0.1 | 5 × 10$^{10}$ | 1.8 × 10$^{12}$ |
| 59 | 30 | 70 | 0.03 | 68.35 | 3.67 | 2.88 | 25.10 | 0.03 | 12600 | 0.4 | 0.05 | 1 × 10$^{11}$ | 2.3 × 10$^{12}$ |
| 60 | 30 | 70 | 0.5 | 68.35 | 3.67 | 2.88 | 25.10 | 0.5 | 8700 | 0.2 | 0.05 | 8 × 10$^{10}$ | 9 × 10$^{12}$ |
| 61 | 30 | 70 | 1.0 | 68.35 | 3.67 | 2.88 | 25.10 | 1.0 | 7100 | 0.6 | 0.1 | 5 × 10$^{10}$ | 2.3 × 10$^{12}$ |
| 62* | 30 | 70 | 2.0 | 68.35 | 3.67 | 2.88 | 25.10 | 2.0 | 5400 | 1.2 | 0.1 | 3 × 10$^{9}$ | 1.8 × 10$^{11}$ |
| 63* | 50 | 50 | 0 | 68.17 | 6.10 | 2.05 | 23.68 | 0 | 9200 | 1.8 | 0.5 | 8 × 10$^{9}$ | 6.8 × 10$^{11}$ |
| 64 | 50 | 50 | 0.001 | 58.17 | 6.10 | 2.05 | 23.68 | 0.001 | 8900 | 0.8 | 0.4 | 4 × 10$^{10}$ | 1.1 × 10$^{12}$ |
| 65 | 50 | 50 | 0.003 | 68.17 | 6.10 | 2.05 | 23.68 | 0.003 | 7550 | 0.5 | 0.3 | 9 × 10$^{10}$ | 2.0 × 10$^{12}$ |
| 66 | 50 | 50 | 0.5 | 68.17 | 6.10 | 2.05 | 23.68 | 0.5 | 6100 | 1.0 | 0.3 | 6 × 10$^{10}$ | 1.4 × 10$^{12}$ |
| 67 | 50 | 50 | 1.0 | 68.17 | 6.10 | 2.05 | 23.68 | 1.0 | 5700 | 1.1 | 0.4 | 2 × 10$^{10}$ | 1.4 × 10$^{11}$ |
| 68* | 50 | 50 | 1.5 | 68.17 | 6.10 | 2.05 | 23.68 | 1.5 | 4700 | 1.1 | 0.5 | 6 × 10$^{9}$ | 1.4 × 10$^{11}$ |
| 69* | 70 | 30 | 0 | 67.99 | 8.51 | 1.23 | 22.27 | 0 | 6000 | 2.1 | 0.6 | 3 × 10$^{9}$ | 2.3 × 10$^{11}$ |
| 70 | 70 | 30 | 0.005 | 67.99 | 8.51 | 1.23 | 22.27 | 0.005 | 5500 | 1.1 | 0.5 | 6 × 10$^{10}$ | 4.5 × 10$^{12}$ |
| 71 | 70 | 30 | 0.01 | 67.99 | 8.51 | 1.23 | 22.27 | 0.01 | 5200 | 0.8 | 0.3 | 4 × 10$^{10}$ | 9.0 × 10$^{11}$ |
| 72* | 70 | 30 | 1.7 | 67.99 | 8.51 | 1.23 | 22.27 | 1.7 | 4100 | 1.8 | 1.1 | 2 × 10$^{9}$ | 4.5 × 10$^{10}$ |

| Sample No. | Basic Ingredients (mol %) A | B | Additive (wt part) Pb(Mn$_{\frac{1}{3}}$Nb$_{\frac{2}{3}}$)O$_3$ | Proportion of Oxides PbO | Fe$_2$O$_3$ | MgO | Nb$_2$O$_5$ | Pb(Mn$_{\frac{1}{3}}$Nb$_{\frac{2}{3}}$)O$_3$ | Electric Properties $\epsilon s$ | tan δ 20° C. | 85° C. | IR (Ω) | ρ(Ω-cm) |
|---|---|---|---|---|---|---|---|---|---|---|---|---|---|
| 73* | 5 | 95 | 0 | 68.58 | 0.61 | 3.92 | 26.89 | 0 | 11,900 | 0.1 | 0.1 | 3 × 10$^{9}$ | 4.5 × 10$^{12}$ |
| 74 | 5 | 95 | 0.05 | 68.58 | 0.61 | 3.92 | 26.89 | 0.05 | 11,000 | 0.1 | 0.05 | 2 × 10$^{10}$ | 9.0 × 10$^{12}$ |
| 75 | 5 | 95 | 0.5 | 68.58 | 0.61 | 3.92 | 26.89 | 0.5 | 10,600 | 0.2 | 0.05 | 4 × 10$^{11}$ | 1.1 × 10$^{13}$ |
| 76 | 5 | 95 | 5.0 | 68.58 | 0.61 | 3.92 | 26.89 | 5.0 | 9,700 | 0.3 | 0.1 | 6 × 10$^{10}$ | 1.4 × 10$^{12}$ |
| 77* | 5 | 95 | 10.0 | 68.58 | 0.61 | 3.92 | 26.89 | 10.0 | 8,100 | 4.6 | 0.5 | 4 × 10$^{9}$ | 9.0 × 10$^{10}$ |
| 78* | 50 | 50 | 0 | 68.17 | 6.10 | 2.05 | 23.68 | 0 | 9,200 | 1.8 | 0.5 | 8 × 10$^{9}$ | 6.8 × 10$^{11}$ |
| 79 | 50 | 50 | 0.05 | 68.17 | 6.10 | 2.05 | 23.68 | 0.05 | 9,000 | 0.9 | 0.3 | 4 × 10$^{10}$ | 1.4 × 10$^{12}$ |
| 80 | 50 | 50 | 0.5 | 68.17 | 6.10 | 2.05 | 23.68 | 0.5 | 8,700 | 0.1 | 0.3 | 2 × 10$^{11}$ | 4.5 × 10$^{12}$ |
| 81 | 50 | 50 | 5.0 | 68.17 | 6.10 | 2.05 | 23.68 | 5.0 | 4,800 | 0.9 | 0.5 | 5 × 10$^{10}$ | 1.1 × 10$^{12}$ |
| 82* | 50 | 50 | 10.0 | 68.17 | 6.10 | 2.05 | 23.68 | 10.0 | 3,900 | 2.9 | 1.1 | 4 × 10$^{9}$ | 9.0 × 10$^{10}$ |
| 83 | 70 | 30 | 0 | 67.99 | 8.51 | 1.23 | 22.27 | 0 | 6,000 | 2.1 | 0.6 | 3 × 10$^{9}$ | 2.3 × 10$^{11}$ |
| 84 | 70 | 30 | 0.05 | 67.99 | 8.51 | 1.23 | 22.27 | 0.05 | 5,800 | 0.9 | 0.5 | 4 × 10$^{10}$ | 9.0 × 10$^{11}$ |
| 85 | 70 | 30 | 0.5 | 67.99 | 8.51 | 1.23 | 22.27 | 0.5 | 5,400 | 0.1 | 0.3 | 3 × 10$^{11}$ | 6.8 × 10$^{12}$ |
| 86 | 70 | 30 | 5.0 | 67.99 | 8.51 | 1.23 | 22.27 | 5.0 | 4,200 | 1.8 | 0.5 | 2 × 10$^{11}$ | 4.5 × 10$^{12}$ |
| 87* | 70 | 30 | 10.0 | 67.99 | 8.51 | 1.23 | 22.27 | 10.0 | 3,700 | 2.6 | 1.5 | 3 × 10$^{9}$ | 6.8 × 10$^{10}$ |

| Sample No. | Basic Ingredients (mol %) A | B | Additive (wt part) Li$_2$O | Proportion of Oxides PbO | Fe$_2$O$_3$ | MgO | Nb$_2$O$_5$ | Li$_2$O | Electric Properties $\epsilon s$ | tan δ 20° C. | 85° C. | IR (Ω) | ρ(Ω-cm) |
|---|---|---|---|---|---|---|---|---|---|---|---|---|---|
| 88* | 20 | 80 | 0 | 68.44 | 2.45 | 3.30 | 25.81 | 0 | 13100 | 0.8 | 0.1 | 6 × 10$^{10}$ | 4.5 × 10$^{12}$ |
| 89 | 20 | 80 | 0.01 | 68.44 | 2.45 | 3.30 | 25.81 | 0.01 | 12800 | 0.7 | 0.2 | 9 × 10$^{10}$ | 6.8 × 10$^{12}$ |
| 90 | 20 | 80 | 0.05 | 68.44 | 2.45 | 3.30 | 25.81 | 0.05 | 11800 | 0.4 | 0.2 | 4 × 10$^{11}$ | 9.0 × 10$^{12}$ |
| 91 | 20 | 80 | 0.1 | 68.44 | 2.45 | 3.30 | 25.81 | 0.1 | 10900 | 0.3 | 0.3 | 5 × 10$^{11}$ | 1.1 × 10$^{13}$ |
| 92 | 20 | 80 | 0.5 | 68.44 | 2.45 | 3.30 | 25.81 | 0.5 | 7600 | 0.4 | 0.3 | 6 × 10$^{11}$ | 1.4 × 10$^{13}$ |
| 93 | 20 | 80 | 2.0 | 68.44 | 2.45 | 3.30 | 25.81 | 2.0 | 6400 | 0.6 | 0.5 | 8 × 10$^{10}$ | 1.8 × 10$^{12}$ |
| 94* | 20 | 80 | 5.0 | 68.44 | 2.45 | 3.30 | 25.81 | 5.0 | 4200 | 5.2 | 2.5 | 8 × 10$^{9}$ | 1.8 × 10$^{11}$ |
| 95* | 50 | 50 | 0 | 68.17 | 6.10 | 2.05 | 23.68 | 0 | 9200 | 1.8 | 0.5 | 8 × 10$^{9}$ | 6.8 × 10$^{11}$ |
| 96 | 50 | 50 | 0.01 | 68.17 | 6.10 | 2.05 | 23.68 | 0.01 | 9000 | 1.5 | 0.4 | 3 × 10$^{10}$ | 9.0 × 10$^{11}$ |
| 97 | 50 | 50 | 0.05 | 68.17 | 6.10 | 2.05 | 23.68 | 0.05 | 8500 | 0.7 | 0.3 | 4 × 10$^{11}$ | 1.1 × 10$^{13}$ |
| 98 | 50 | 50 | 0.1 | 68.17 | 6.10 | 2.05 | 23.68 | 0.1 | 7700 | 0.5 | 0.3 | 3 × 10$^{11}$ | 6.8 × 10$^{12}$ |
| 99 | 50 | 50 | 0.5 | 68.17 | 6.10 | 2.05 | 23.68 | 0.5 | 6200 | 0.5 | 0.4 | 2 × 10$^{11}$ | 4.5 × 10$^{12}$ |
| 100 | 50 | 50 | 2.0 | 68.17 | 6.10 | 2.05 | 23.68 | 2.0 | 4700 | 0.8 | 0.8 | 7 × 10$^{10}$ | 1.6 × 10$^{12}$ |
| 101* | 50 | 50 | 5.0 | 68.17 | 6.10 | 2.05 | 23.68 | 5.0 | 3700 | 6.5 | 3.0 | 9 × 10$^{9}$ | 8.0 × 10$^{11}$ |

| Sample No. | Basic Ingredients (mol %) A | B | Additive (wt part) Cr$_2$O$_3$ | Proportion of Oxides PbO | Fe$_2$O$_3$ | MgO | Nb$_2$O$_5$ | Cr$_2$O$_3$ | Electric Properties $\epsilon s$ | tan δ 20° C. | 85° C. | IR (Ω) | ρ(Ω-cm) |
|---|---|---|---|---|---|---|---|---|---|---|---|---|---|
| 102 | 5 | 95 | 0 | 68.58 | 0.61 | 3.92 | 26.89 | 0 | 12500 | 0.2 | 0.1 | 2 × 10$^{11}$ | 4.5 × 10$^{12}$ |
| 103 | 5 | 95 | 0.05 | 68.58 | 0.61 | 3.92 | 26.89 | 0.05 | 13100 | 0.3 | 0.1 | 4 × 10$^{11}$ | 9.0 × 10$^{12}$ |

Table 1-continued

| Sample No. | Basic Ingredients (mol %) A | B | Additive (wt part) CeO$_2$ | Proportion of Oxides PbO | Fe$_2$O$_3$ | MgO | Nb$_2$O$_5$ | CeO$_2$ | Electrical Properties $\epsilon s$ | tan $\delta$ | IR ($\Omega$) | $\rho$($\Omega$-cm) |
|---|---|---|---|---|---|---|---|---|---|---|---|---|
| 104 | 5 | 95 | 0.5 | 68.58 | 0.61 | 3.92 | 26.89 | 0.5 | 13600 | 0.3 | 0.1 | $8 \times 10^{11}$ $1.8 \times 10^{13}$ |
| 105 | 5 | 95 | 1.0 | 68.58 | 0.61 | 3.92 | 26.89 | 1.0 | 12900 | 0.4 | 0.2 | $5 \times 10^{11}$ $1.1 \times 10^{13}$ |
| 106 | 5 | 95 | 2.0 | 68.58 | 0.61 | 3.92 | 26.89 | 2.0 | 11800 | 0.8 | 0.5 | $1 \times 10^{11}$ $2.3 \times 10^{12}$ |
| 107* | 5 | 95 | 3.0 | 68.58 | 0.61 | 3.92 | 26.89 | 3.0 | 8300 | 2.3 | 1.3 | $6 \times 10^{9}$ $1.4 \times 10^{11}$ |
| 108 | 50 | 50 | 0 | 68.17 | 6.10 | 2.05 | 23.68 | 0 | 9600 | 1.9 | 0.5 | $6 \times 10^{9}$ $6.8 \times 10^{11}$ |
| 109 | 50 | 50 | 0.05 | 68.17 | 6.10 | 2.05 | 23.68 | 0.05 | 10200 | 1.8 | 0.5 | $1 \times 10^{10}$ $1.6 \times 10^{12}$ |
| 110 | 50 | 50 | 0.5 | 68.17 | 6.10 | 2.05 | 23.68 | 0.5 | 11010 | 1.8 | 0.6 | $3 \times 10^{11}$ $6.8 \times 10^{12}$ |
| 111 | 50 | 50 | 1.0 | 68.17 | 6.10 | 2.05 | 23.68 | 1.0 | 10900 | 2.0 | 0.6 | $5 \times 10^{10}$ $1.1 \times 10^{12}$ |
| 112 | 50 | 50 | 2.0 | 68.17 | 6.10 | 2.05 | 23.68 | 2.0 | 9700 | 2.2 | 0.6 | $8 \times 10^{9}$ $2.3 \times 10^{11}$ |
| 113* | 50 | 50 | 3.0 | 68.17 | 6.10 | 2.05 | 23.68 | 3.0 | 5800 | 4.3 | 1.3 | $3 \times 10^{8}$ $6.8 \times 10^{9}$ |
| 114* | 70 | 30 | 0 | 67.99 | 8.51 | 1.25 | 22.27 | 0 | 5800 | 2.3 | 0.6 | $2 \times 10^{9}$ $2.2 \times 10^{11}$ |
| 115 | 70 | 30 | 0.05 | 67.99 | 8.51 | 1.23 | 22.27 | 0.05 | 6110 | 2.2 | 0.5 | $4 \times 10^{10}$ $9.0 \times 10^{11}$ |
| 116 | 70 | 30 | 0.5 | 67.99 | 8.51 | 1.23 | 22.27 | 0.5 | 6300 | 2.1 | 0.7 | $2 \times 10^{11}$ $4.5 \times 10^{12}$ |
| 117 | 70 | 30 | 1.0 | 67.99 | 8.51 | 1.23 | 22.27 | 1.0 | 5920 | 2.0 | 0.8 | $8 \times 10^{10}$ $1.8 \times 10^{12}$ |
| 118 | 70 | 30 | 2.0 | 67.99 | 0.51 | 1.23 | 22.27 | 2.0 | 5600 | 2.8 | 0.8 | $6 \times 10^{9}$ $4.5 \times 10^{11}$ |
| 119* | 70 | 30 | 3.0 | 67.99 | 8.51 | 1.23 | 22.27 | 3.0 | 3700 | 5.2 | 1.5 | $5 \times 10^{8}$ $1.1 \times 10^{10}$ |
| 120 | 5 | 95 | 0.05 | 68.58 | 0.61 | 3.92 | 26.89 | 0.05 | 13100 | 0.3 | | $4 \times 10^{11}$ $6.8 \times 10^{12}$ |
| 121 | 5 | 95 | 0.5 | 68.58 | 0.61 | 3.92 | 26.89 | 0.5 | 13600 | 0.3 | | $8 \times 10^{11}$ $1.1 \times 10^{13}$ |
| 122 | 5 | 95 | 1.0 | 68.58 | 0.61 | 3.92 | 26.89 | 1.0 | 12900 | 0.4 | | $5 \times 10^{11}$ $9.0 \times 10^{12}$ |
| 123 | 5 | 95 | 2.0 | 68.58 | 0.61 | 3.92 | 26.89 | 2.0 | 11800 | 0.8 | | $1 \times 10^{11}$ $4.5 \times 10^{12}$ |
| 124* | 5 | 95 | 3.0 | 68.58 | 0.61 | 3.92 | 26.89 | 3.0 | 8300 | 2.3 | | $6 \times 10^{9}$ $2.0 \times 10^{11}$ |
| 125 | 50 | 50 | 0.05 | 68.17 | 6.10 | 2.05 | 23.68 | 0.05 | 10200 | 1.8 | | $1 \times 10^{11}$ $4.5 \times 10^{12}$ |
| 126 | 50 | 50 | 0.5 | 68.17 | 6.10 | 2.05 | 23.68 | 0.5 | 11010 | 1.8 | | $2 \times 10^{11}$ $6.8 \times 10^{12}$ |
| 127 | 50 | 50 | 1.0 | 68.17 | 6.10 | 2.05 | 23.68 | 1.0 | 10900 | 2.0 | | $5 \times 10^{10}$ $1.1 \times 10^{12}$ |
| 128 | 50 | 50 | 2.0 | 68.17 | 6.10 | 2.05 | 23.68 | 2.0 | 9700 | 2.2 | | $8 \times 10^{9}$ $4.5 \times 10^{11}$ |
| 129* | 50 | 50 | 3.0 | 68.17 | 6.10 | 2.05 | 23.68 | 3.0 | 5800 | 4.3 | | $3 \times 10^{8}$ $1.8 \times 10^{10}$ |
| 130 | 70 | 30 | 0.05 | 67.99 | 8.51 | 1.23 | 22.27 | 0.05 | 6110 | 2.2 | | $4 \times 10^{10}$ $9.0 \times 10^{11}$ |
| 131 | 70 | 30 | 0.5 | 67.99 | 8.51 | 1.23 | 22.27 | 0.5 | 6300 | 2.1 | | $2 \times 10^{11}$ $2.0 \times 10^{12}$ |
| 132 | 70 | 30 | 1.0 | 67.99 | 8.51 | 1.23 | 22.27 | 1.0 | 5920 | 2.0 | | $8 \times 10^{10}$ $1.8 \times 10^{12}$ |
| 133 | 70 | 30 | 2.0 | 67.99 | 8.51 | 1.23 | 22.27 | 2.0 | 5600 | 2.8 | | $6 \times 10^{9}$ $6.8 \times 10^{11}$ |
| 134 | 70 | 30 | 3.0 | 67.99 | 8.51 | 1.23 | 22.27 | 3.0 | 3700 | 5.2 | | $5 \times 10^{8}$ $2.0 \times 10^{10}$ |

The sintering temperatures of Samples Nos. 1 through 12 and the temperature dependence of the dielectric constant are shown in Table 2, below.

Table 2

| Sample No. | Temperature Dependence (%) -25° C. | +85° C. | Sintering Temperature (°C.) |
|---|---|---|---|
| 1* | +2.0 | -50.0 | 1150 |
| 2* | +6.5 | -58.4 | 1100 |
| 3 | -13.4 | -43.7 | 1000 |
| 4 | -20.5 | -46.3 | 980 |
| 5 | -28.5 | -40 | 950 |
| 6 | -47.7 | -37.7 | 950 |
| 7 | -50.4 | -25.9 | 980 |
| 8 | -54.3 | +6.8 | 950 |
| 9 | -45.8 | +5.2 | 980 |
| 10 | -41.6 | +40 | 950 |
| 11* | -27.9 | +17.9 | 900 |
| 12* | -22.6 | +29.4 | 900 |

Sintering temperatures of Samples Nos. 88 through 101 are shown in Table 3.

Table 3

| Sample No. | Proportion of Oxides PbO | Fe$_2$O$_3$ | MgO | Nb$_2$O$_5$ | Li$_2$O | Sintering Temperature (°C.) |
|---|---|---|---|---|---|---|
| 88* | 68.44 | 2.45 | 3.30 | 25.81 | 0 | 950 |
| 89 | 68.44 | 2.45 | 3.30 | 25.81 | 0.01 | 920 |
| 90 | 68.44 | 2.45 | 3.30 | 25.81 | 0.05 | 900 |
| 91 | 68.44 | 2.45 | 3.30 | 25.81 | 0.1 | 870 |
| 92 | 68.44 | 2.45 | 3.30 | 25.81 | 0.5 | 800 |
| 93 | 68.44 | 2.45 | 3.30 | 25.81 | 2.0 | 740 |
| 94* | 68.44 | 2.45 | 3.30 | 25.81 | 5.0 | 720 |
| 95* | 68.17 | 6.10 | 2.05 | 23.68 | 0 | 950 |
| 96 | 68.17 | 6.10 | 2.05 | 23.68 | 0.01 | 920 |
| 97 | 68.17 | 6.10 | 2.05 | 23.68 | 0.05 | 900 |
| 98 | 68.17 | 6.10 | 2.05 | 23.68 | 0.1 | 880 |
| 99 | 68.17 | 6.10 | 2.05 | 23.68 | 0.5 | 800 |
| 100 | 68.17 | 6.10 | 2.05 | 23.68 | 2.0 | 740 |
| 101* | 68.17 | 6.10 | 2.05 | 23.68 | 5.0 | 720 |

The sintering temperatures of Samples other than those mentioned in Tables 2 and 3, above, were as follows. The sintering temperature of the control samples was 1000° C. The sintering temperature of the samples according to the present invention containing Pb(Mn$_\frac{2}{3}$W$_\frac{1}{3}$)O$_3$, Pb(Mn$_\frac{1}{2}$W$_\frac{1}{2}$)O$_3$, was a predetermined temperature in the range of from 850° to 950° C. The sintering temperature of the samples according to the present invention containing Pb(Mg$_\frac{1}{3}$Nb$_\frac{2}{3}$)O$_3$, MnO, Pb(Mn$_\frac{1}{3}$Nb$_\frac{2}{3}$)O$_3$, Cr$_2$O$_3$ and CeO$_2$ was a predetermined temperature in the range of from 850 to 950° C. The sintering temperature of the samples containing Pb(Mn$_\frac{1}{3}$Ta$_\frac{2}{3}$)O$_3$ was a predetermined temperature in the range of from 700° to 850° C.

The specimens having the composition of Sample 6 and a control samples having a composition of 63.63 mol % of Pb(Fe$_\frac{1}{2}$ Nb$_\frac{1}{2}$)O$_3$ −35.82 mol % of Pb(Fe$_\frac{2}{3}$ W$_\frac{1}{3}$)O$_3$ −0.5 wt % of Pb(Mn$_\frac{1}{3}$ Nb$_\frac{2}{3}$)O$_3$ were sintered at 900, 950, 1000° and 1080° C., and the insulation resistance of these samples was measured. The measurement result is as shown in Table 4.

Table 4

| Sintering Temperature (°C.) | IR ($\Omega$) No. 6 | CONTROL |
|---|---|---|
| 900 | $5 \times 10^{10}$ | $6 \times 10^{9}$ |
| 950 | $8 \times 10^{10}$ | $2 \times 10^{10}$ |
| 1000 | $9 \times 10^{10}$ | $8 \times 10^{9}$ |
| 1080 | $8 \times 10^{6}$ | $7 \times 10^{8}$ |

The insulation resistance of Sample No. 6 and the control sample mentioned above was measured at 20°, 40°, 60°, 80° and 100° C. The measurement result was as shown in Table 5.

Table 5

| Measuring | IR (Ω) | |
| Temperature (°C.) | No. 6 | CONTROL |
| --- | --- | --- |
| 20 | $8 \times 10^{10}$ | $2 \times 10^{10}$ |
| 40 | $1.1 \times 10^{11}$ | $9 \times 10^{9}$ |
| 60 | $1 \times 10^{11}$ | $3 \times 10^{9}$ |
| 80 | $9 \times 10^{10}$ | $8 \times 10^{8}$ |
| 100 | $9 \times 10^{10}$ | $2 \times 10^{8}$ |

Sintering temperature was 950° C.

What we claim is:

1. A high dielectric constant type-, ceramic composition, hereinafter referred to as the basic ceramic composition, consisting essentially of from 67.99 to 68.58% of PbO, from 0.61 to 8.51% of $Fe_2O_3$, from 1.23 to 3.92% of MgO and from 22.27 to 26.89% of $Nb_2O_5$, all percentages being by weight based on the basic composition.

2. A high dielectric constant type-, ceramic composition according to claim 1, wherein the dielectric constant of the basic composition is from 6000 to 14000 and the dielectric loss (tan δ at 1 KHz) is from 0.1 to 2.1%.

3. A high dielectric constant type-, ceramic composition according to claim 1, wherein the basic composition comprises from 68.26 to 68.58% of PbO, from 0.61 to 4.88% of $Fe_2O_3$, 2.47 to 3.92% of MgO, and from 24.39 to 26.89% of $Nb_2O_5$.

4. A high dielectric constant type-, ceramic composition according to claim 1, wherein said ceramic composition further comprises $Pb(Mn_{\frac{2}{3}}W_{\frac{1}{3}})O_3$ in an amount of from 0.05 to 5.0 parts by weight based on 100 weight parts of the basic composition.

5. A high dielectric constant type-, ceramic composition according to claim 4, wherein said ceramic composition exhibits a dielectric constant of from approximately 5000 to 13000, a dielectric loss (tan δ at 1 KHz) of from 0.07 to 2.0%, and an insulation resistance of $7 \times 10^{10}$ or more.

6. A high dielectric constant type-, ceramic composition according to claim 4, wherein said $Pb(Mn_{\frac{2}{3}}W_{\frac{1}{3}})O_3$ content is from 0.05 to 0.5 part by weight, and the basic composition is from 68.35 to 68.58% of PbO, from 0.61 to 3.67% of $Fe_2O_3$, from 25.10 to 26.89% of $Nb_2O_5$ and from 2.88 to 3.92% of MgO, and said ceramic composition exhibits a dielectric loss (tan δ at 1 KHz) of 0.5% or less and an insulation resistance of $10^{11}$ Ω or more.

7. A high dielectric onstant type-, ceramic composition according to claim 1, wherein said ceramic composition further comprises $Pb(Mn_{\frac{1}{2}}W_{\frac{1}{2}})O_3$ in an amount of from 0.05 to 5.0 parts by weight based on 100 weight parts of the basic composition.

8. A high dielectric constant type-, ceramic composition according to claim 7, wherein said composition exhibits a dielectric constant ($ε_s$) of from approximately 5000 to 13000, a dielectric loss (tan δ at 1 KHz) of from 0.07 to 2.0%, and an insulation resistance of $7 \times 10^{10}$ or more.

9. A high dielectric constant type-, ceramic composition according to claim 7, the content of said $Pb(Mn_{\frac{1}{2}}W_{\frac{1}{2}})O_3$ is from 0.05 to 0.5 part by weight, and the basic composition is from 68.35 to 68.58% of PbO, from 0.61 to 3.67% of $Fe_2O_3$, from 25.10 to 26.89% of $Nb_2O_5$, and from 2.88 to 3.92% of MgO, and said ceramic composition exhibits a dielectric loss (tan δ at 1 KHz) of 1.0% or less and the insulation resistance of $10^{11}$ Ω or more.

10. A high dielectric constant type-, ceramic composition according to claim 9, wherein the basic composition comprises from 68.5 to 68.6% of PbO, from 0.61 to 1.0% of $Fe_2O_3$, from 26.0 to 26.89% of $Nb_2O_5$ and from 3.5 to 3.92% of MgO and said ceramic composition exhibits a dielectric constant (tan δ at 1 KHz) of less than 0.1%.

11. A high dielectric constant type-, ceramic composition according to claim 1, wherein said ceramic composition further comprises $Pb(Mn_{\frac{1}{2}}Ta_{\frac{1}{2}})O_3$ in an amount of from 0.05 to 5.0 parts by weight based on 100 weight parts of the basic composition.

12. A high dielectric constant type-, ceramic composition according to claim 11, wherein said ceramic composition exhibits a dielectric constant of from approximately 4900 to 12000, a dielectric loss (tan δ at 1 KHz) of from 0.1 to 1.6%, and an insulation resistance of $4 \times 10^{11}$ Ω or more.

13. A high dielectric constant type-, ceramic composition according to claim 1, wherein said ceramic composition further comprises MnO in an amount of from 0.001 to 1.0 part by weight based on 100 weight parts of the basic ceramic composition.

14. A high dielectric constant type-, ceramic composition according to claim 13, wherein said ceramic composition exhibits a dielectric onstant of from approximately 5200 to 12600, a dielectric loss (tan δ at 1 KHz) of from 0.2 to 1.1%, and an insulation resistance of from $1 \times 10^{10}$ to $1 \times 10^{11}$ Ω.

15. A high dielectric constant type-, ceramic composition according to claim 13, wherein the content of said MnO is from 0.001 to less than 0.5 part by weight, and said ceramic composition exhibits a dielectric loss (tan δ at 1 KHz) of approximately 1% or less.

16. A high dielectric constant type-, ceramic composition according to claim 1, wherein said ceramic composition further comprises $Pb(Mn_{\frac{1}{2}}Nb_{\frac{1}{2}})O_3$ in an amount of from 0.05 to 5.0 parts by weight based on 100 weight parts of the basic ceramic composition.

17. A high dielectric constant type-, ceramic composition according to claim 16, said ceramic composition exhibits a dielectric constant of from approximately 4200 to 11000, a dielectric loss (tan δ at 1 KHz) of from 0.1 to 0.9%, and an insulation resistance of from $2 \times 10^{10}$ to $4 \times 10^{11}$ Ω.

18. A high dielectric constant type-, ceramic composition according to claim 16, wherein the content of said $Pb(Mn_{\frac{1}{2}}Nb_{\frac{1}{2}})O_3$ is from 0.05 to 0.5 part by weight and said ceramic composition exhibits a dielectric loss (tan δ at 1 KHz) of 0.2% or less, an insulation resistance of $10^{11}$ Ω or more.

19. A high dielectric constant type-, ceramic composition according to claim 1, wherein said ceramic composition further comprises $Li_2O$ in an amount of from 0.01 to 2.0 parts by weight based on 100 weight parts of the basic composition.

20. A high dielectric constant type-, ceramic composition according to claim 19, wherein said ceramic composition exhibits a dielectric constant of from 4700 to 12800 dielectric loss (tan δ at 1 KHz) of from 0.3 to 1.5%.

21. A high dielectric constant type-, ceramic composition according to claim 19, wherein the content of said $Li_2O$ is from 0.05 to 0.1 part by weight, and said ceramic composition exhibits a dielectric loss (tan δ at 1

KHz) of 0.7% or less and an insulation resistance of from $1\times10^{11}$ Ω or more.

22. A high dielectric constant type-, ceramic composition according to claim 1, wherein said ceramic composition further comprises at least one member selected from the group consisting of $Cr_2O_3$ and $CeO_2$ in an amount of from 0.05 to 2.0 parts by weight based on 100 parts of the basic composition.

23. A high dielectric constant type-, ceramic composition according to claim 22, wherein said ceramic composition exhibits a dielectric constant of from approximately 5600 to 13600, a dielectric loss (tan δ at 1 KHz) of from 0.2 to 2.8%, and an insulation resistance of from $6\times10^9$ to $8\times10^{11}$ Ω.

24. A high dielectric constant type-, ceramic composition according to claim 22, wherein the content of said at least one member is from 0.05 to 0.5 part by weight, and the basic composition is from 68.17 to 68.58% of PbO, from 0.61 to 6.10% of $Fe_2O_3$, from 23.68 to 26.89% of $Nb_2O_5$ and from 2.05 to 3.92% of MgO, and said ceramic composition exhibits a dielectric loss of 2.0% or less and an insulation resistance of $3\times10^{10}$ Ω or more.

25. A high dielectric constant type-, ceramic composition according to claim 23, wherein the basic composition is from 68.5 to 68.58% of PbO, from 0.61 to 1.0% of $Fe_2O_3$, from 26.0 to 26.89% of $Nb_2O_5$, and from 3.0 to 3.92% of MgO, and said ceramic composition exhibits a dielectric constant is of more than 13000 and a dielectric loss (tan δ at 1 KHz) of less than 0.5%.

* * * * *

UNITED STATES PATENT AND TRADEMARK OFFICE
CERTIFICATE OF CORRECTION

PATENT NO. : 4,216,102
DATED : Aug. 5, 1980
INVENTOR(S) : Furukawa et al

It is certified that error appears in the above—identified patent and that said Letters Patent is hereby corrected as shown below:

On the first page, in Item [30], change "Aug. 3, 1978" to --July 3, 1978--.

In the Abstract, line 8, change "pb(Mn$_{1/2}$W$_{1/2}$)O$_3$" to --Pb(Mn$_{1/2}$W$_{1/2}$)O$_3$--.

Col. 3, line 18, change "of pbO" to --of PbO--.

Col. 3, line 34, change "of pbO" to --PbO--.

Col. 4, lines 8 and 9, change "This composition correspond" to --This composition corresponds--.

Col. 4, lines 51 and 52, change "sintered at temperature" to --sintered at a temperature--.

Col. 6, line 32, change "Pb(Mn$_{1/2}$Ta$_{170}$)O$_3$" to --Pb(Mn$_{1/2}$Ta$_{1/3}$)O$_3$--.

Col. 6, line 48, after "800°" insert --to--.

Col. 6, line 63, change "oxide mixture" to --oxide mixtures--.

Col. 7, line 2, delete first occurrence of "a".

Table 1 (first chart), under column entitled Sample No., delete " * " next to the number "3".

Table 1 (fifth chart), under column entitled PbO (fifth column), change "58.17" to --68.17--.

UNITED STATES PATENT AND TRADEMARK OFFICE
CERTIFICATE OF CORRECTION

PATENT NO. : 4,216,102

DATED : Aug. 5, 1980

INVENTOR(S) : Furukawa et al

It is certified that error appears in the above—identified patent and that said Letters Patent is hereby corrected as shown below:

Table 1 (sixth chart), under column entitled Sample No., after "83" insert -- * --.

Table 1 (sixth chart), under column entitled Additive (wt. part), change "$Pb(Mn_{1/2}NB_{2/3})O_3$" to --$Pb(Mn_{1/3}Nb_{2/3})O_3$--.

Table 1 (eighth chart), under column entitled $Fe_2O_3$ (sixth column, change "0.51" to --8.51--.

Table 1 (eighth chart), under column entitled MgO (seventh column), change "1.25" to --1.23--.

Col. 12, line 39, change "Samples" to --samples--.

Col. 13, line 34, change "$Pb(Mn_{2/3}W_{5/8})O_3$" to --$Pb(Mn_{2/3}W_{1/3})O_3$--.

Col. 13, line 51, change "onstant" to --constant--.

Col. 14, line 28, change "onstant" to --constant--.

Col. 16, line 14, after "dielectric constant" delete --is--.

Signed and Sealed this

Third Day of February 1981

[SEAL]

Attest:

RENE D. TEGTMEYER

Attesting Officer     Acting Commissioner of Patents and Trademarks